United States Patent
Nakayama et al.

[11] Patent Number: 6,090,735
[45] Date of Patent: Jul. 18, 2000

[54] SEMICONDUCTIVE CERAMIC COMPOSITION AND SEMICONDUCTIVE CERAMIC ELEMENT USING THE SAME

[75] Inventors: Akinori Nakayama, Otsu; Terunobu Ishikawa, Shiga-ken; Hideaki Nimi, Hikone; Ryouichi Urahara, Yokaichi; Yukio Sakabe, Kyoto, all of Japan

[73] Assignee: Murata Manufacturing Co., Ltd., Japan

[21] Appl. No.: 09/167,895

[22] Filed: Oct. 7, 1998

[30] Foreign Application Priority Data

Oct. 8, 1997 [JP] Japan .................................. 9-275809
Oct. 8, 1997 [JP] Japan .................................. 9-275810

[51] Int. Cl.$^7$ ............................. C04B 35/50; H01C 7/04
[52] U.S. Cl. ...................... 501/152; 501/126; 501/127; 501/128; 501/153; 501/154; 501/103; 501/105; 252/62.3 T; 361/115; 361/27; 361/106
[58] Field of Search ............................. 361/115, 27, 106; 252/62.3 T; 501/152, 126, 127, 128, 153, 154, 103, 105

[56] References Cited

U.S. PATENT DOCUMENTS 5,703,000 12/1997 Nakayama et al. .................... 501/152

FOREIGN PATENT DOCUMENTS

| 0609888A1 | 2/1994 | European Pat. Off. . |
|---|---|---|
| 609888 | 2/1994 | European Pat. Off. . |
| 0635852A2 | 7/1994 | European Pat. Off. . |
| 635852 | 7/1994 | European Pat. Off. . |
| 0609888A1 | 8/1994 | European Pat. Off. . |
| 0635852A2 | 1/1995 | European Pat. Off. . |
| 0673675A2 | 9/1995 | European Pat. Off. . |
| 51-122799 | 10/1976 | Japan . |
| 59-181502 | 10/1984 | Japan . |
| 7-176406 | 7/1995 | Japan . |

OTHER PUBLICATIONS

V.G. Bhide and D.S. Rajoria, "Mössbauer Studies of the High–Spin–Low–Spin Equilibria and the Localized–Collective Electron Transition in $LaCoO_3$, " Physical Review B, vol. 6, No. 3, pp. 1021–1032 (Aug. 1, 1972).

*Primary Examiner*—C. Melissa Koslow
*Attorney, Agent, or Firm*—Ostrolenk, Faber, Gerb & Soffen, LLP

[57] ABSTRACT

A semiconductive ceramic composition having negative resistance-temperature characteristics, wherein the composition comprises lanthanum cobalt oxide as the primary component, and, as secondary components, at least one oxide of an element selected from B, Fe and Al and at least one oxide of an element selected from Si, Zr, Hf, Ta, Sn, Sb, W, Mo, Te, Ce, Nb, Mn, Th and P. A semiconductive ceramic composition having a resistivity of approximately 10 Ω·cm to 100 Ω·cm at room temperature is obtained by controlling the amount of additives. Since the resistivity at room temperature can be enhanced to several times or more that of the conventional compositions while characteristics of the conventional compositions are maintained, the composition may be widely applied to control heavy current.

17 Claims, 1 Drawing Sheet

SEMICONDUCTIVE CERAMIC COMPOSITION AND SEMICONDUCTIVE CERAMIC ELEMENT USING THE SAME

BACKGROUND OF THE INVENTION

1. Field of the Invention

The present invention relates to a semiconductive ceramic composition, and more specifically to a semiconductive ceramic composition having negative resistance-temperature characteristics. The present invention also relates to a semiconductive ceramic element making use of the semiconductive ceramic composition (a Negative Temperature Coefficient or "NTC" thermistor). The element is used, for example, for the prevention of rush current and the realization of "soft-starting" of a motor.

2. Background Art

The word "thermistor" is derived from "thermally sensitive resistor" and refers to an element whose resistance varies depending on temperature. An NTC thermistor is a kind of semiconductive ceramic element and has characteristics by which resistance decreases with increase of temperature.

The B constant is defined by the following equation, wherein $\rho(T)$ is the resistivity at temperature T, $\rho(T_0)$ is the resistivity at temperature $T_0$, and ln is natural logarithm.

$$B \text{ constant} = [\ln \rho(T_0) - \ln \rho(T)]/(1/T_0 - 1/T)$$

The greater the value of B constant, the greater the variation of resistance of an NTC thermistor per unit temperature change.

An NTC thermistor is incorporated into, for example, a rectification circuit for a power source in an electronic apparatus. The rectification circuit for the power source has a smoothing capacitor having a large capacitance. The NTC thermistor suppresses the strong rush of current flowing into the capacitor upon switching on the power. Thereafter, the thermistor comes to have lowered resistance through self-heating, so that the circuit operates at a steady state. The NTC thermistor is useful for achieving soft-starting of the circuit and for protecting the rectifier and the capacitor having large capacitance.

As a material for NTC thermistors, there has been used spinel composite oxides containing a transition metal element.

One requirement for an ideal NTC thermistor to prevent rush current is sufficiently low resistance of the thermistor at high temperature (about 140–200° C.). As resistance of the thermistor decreases, power is conserved during steady state operation of the circuit. In order to decrease the resistance of the thermistor at high temperature, the B constant at high temperature is increased. Conventional NTC thermistors have a B constant value of 3250 K at most.

Another requirement is that the resistance of the thermistor at low temperature (in the range between about –10 and +60° C.) must not be very high. A considerable increase of the resistance is observed for conventional NTC thermistors, especially at a low temperature below 0° C. Consequently, a voltage drop occurs at low temperature to sometimes hamper normal starting-up of the electronic apparatus. In order to prevent an increase of the resistance at low temperature, the B constant at low temperature is reduced.

The B constant of a lanthanum cobalt oxide is reported to be temperature-dependent (see, for example, V. G. Bhide and D. S. Rajoria, Phys. Rev. B6, [3], 1072, 1972, etc.).

The present inventors previously obtained an NTC thermistor satisfying the two above requirements, i.e., having a B constant of about 3000 K or less near room temperature and a B constant of about 4000 K or more at high temperature, by incorporating at least one element selected from the group consisting of Si, Zr, Hf, Ta, Sn, Sb, W, Mo, Te and Ce into a primary component formed of lanthanum cobalt oxide (Japanese Patent Application Laid-Open (kokai) No. 7-176406). Resistivity and B constant of the obtained NTC thermistors are in proportion to the amount of the additive(s). This is because the additive functions as a donor within the lanthanum cobalt oxide to compensate for impurities (acceptors such as Ni, Ca, etc.) contained in the oxide. Therefore, if additives are incorporated in excessive amounts, the resistivity and B constant decrease at room temperature.

The peak values of the resistivity and B constant of lanthanum cobalt oxide at room temperature (25° C.) to 140° C. are approximately 20 $\Omega \cdot$cm and approximately 4700 K. Conventionally, there have been obtained no NTC thermistors having a resistivity equal to or higher than the above value.

Depending on use of the NTC thermistor, a resistance equal to or higher than the above value may be required. Although higher resistivity may be obtained by increasing the volume of the NTC thermistor, an increase of the volume is contradictory to demands for smaller elements. The modification of the volume thereof in accordance with the type of thermistor invites an increase of manufacturing costs.

In the meantime, lanthanum cobalt oxide has extremely poor sinterability, and the sintered density thereof sometimes fails to reach 90% or more of the theoretical density. Heretofore customary sintering aids such as $SiO_2$ have not been usable, since the balance between the donors and the acceptors—which exist in very small amounts—affects the resistance-temperature characteristics.

SUMMARY OF THE INVENTION

Accordingly, an object of the present invention is to provide a semiconductive ceramic composition having a resistivity higher than that of the conventional compositions in the room temperature region.

Another object of the present invention is to enhance sinterability of the above composition.

According to the present invention, there is provided a semiconductive ceramic composition having negative resistance-temperature characteristics, wherein the composition comprises lanthanum cobalt oxide as a primary component, and, as a secondary component, at least one oxide of an element selected from among Si, Zr, Hf, Ta, Sn, Sb, W, Mo, Te, Ce, Nb, Mn, Th and P.

Preferably, at least one oxide of Fe and Al is present in a total amount of about 0.001–30 mol % as Fe or Al and the at least one oxide of an element selected from Si, Zr, Hf, Ta, Sn, Sb, W, Mo, Te, Ce, Nb, Mn, Th and P is present in a total amount of about 0.001–10 mol % calculated as such element.

Alternatively and preferably, the at least one oxide of an element selected from Fe and Al is in a total amount of about 0.1–10 mol % and the at least one oxide of an element selected from Si, Zr, Hf, Ta, Sn, Sb, W, Mo, Te, Ce, Nb, Mn, Th and P is in a total amount of 0.1–5 mol %.

The aforementioned lanthanum cobalt oxide may be in the form of $La_xCoO_3$ ($0.60 \leq x \leq 0.99$). The La of the aforementioned $La_xCoO_3$ may be partially substituted with any of Pr, Nd and Sm, as known conventionally.

The above-described ceramics contains an oxide of B. Addition of the oxide of B enhances the sintered density.

These compositions are useful, among others, for the fabrication of an NTC thermistor which is used for preventing rush current or controlling a motor so as to achieve soft-starting.

DETAILED DESCRIPTION OF THE INVENTION AND PREFERRED EMBODIMENTS

Figure 1:
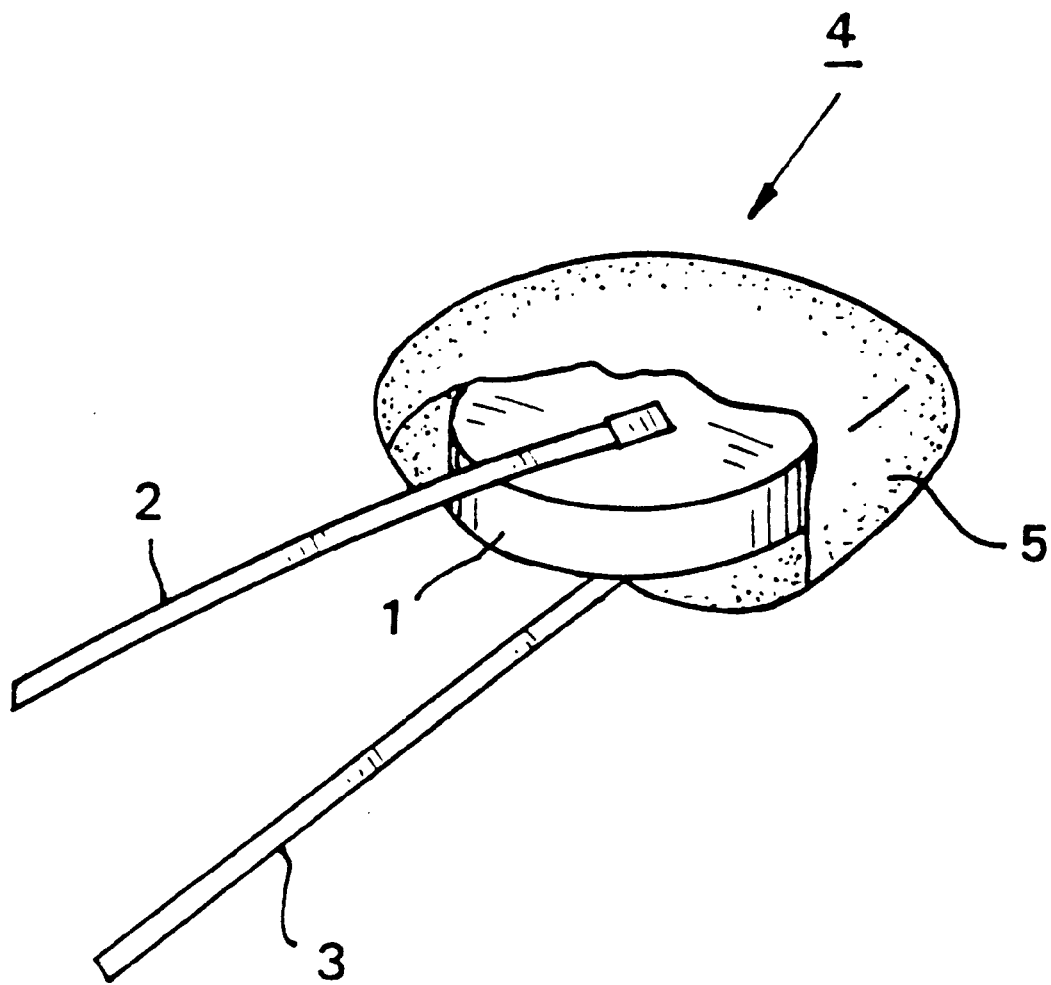
FIG. 1 is a partially-cut-away view of an NTC thermistor of the present invention.

Next, embodiments of the present invention will be described by way of examples.

EXAMPLE 1

This example is directed to an embodiment using $La_{0.94}CoO_3$ as a lanthanum cobalt oxide.

First, powders of $La_xCoO_3$ and $Co_3O_4$ were weighed and mixed so as to adjust the mole ratio of lanthanum to cobalt to 0.94. Subsequently, each of the additive elements shown in Tables 1 and 2 was weighed in a predetermined amount in the form of a compound such as an oxide, and was added to the weighed powder mixture. The amount of the added element shown in Tables 1 and 2 represents the amount calculated as the element.

Each of the thus-obtained powder was wet-mixed with pure water and nylon balls for 16 hours, followed by drying. The resultant mixture was calcined at 1000° C. for two hours. The calcined material was ground, and a vinyl acetate binder was added thereto in an amount of 3 wt. %, followed by additional wet-mixing with pure water and nylon balls for 16 hours. Thereafter, the mixture was subjected to drying, granulation, press-forming into a disk shape, and was calcined at 1350° C. for two hours in air, to thereby obtain a semiconductive ceramic 1. Subsequently, a platinum paste was screen-printed onto both surfaces of the semiconductive ceramic, and the semiconductive ceramic was baked at 1000° C. for two hours in air to form external electrodes 2 and 3, to thereby obtain an NTC thermistor 4 (FIG. 1). Optionally, the surfaces of the semiconductive ceramic may be coated with a resin layer 5 for protection of the semiconductive ceramic. Also, there may be obtained an NTC thermistor having another structure, such as an NTC thermistor having layered electrodes contained therein.

The thus-obtained NTC thermistor was measured for the electric characteristics of resistivity $\rho$ and B constant. The results are shown in Tables 1 and 2. In Tables 1 and 2, the Sample Nos. marked with "*" represent thermistors outside the scope of the present invention, and the others represent those within the scope of the present invention. Resistivity $\rho$ was measured at 25° C.

According to Equation (1), the B constants, i.e., B(−10° C.) and B(140° C.), obtained herein are defined as follows:

$$B(-10°\ C.) = \frac{[ln\rho(-10°\ C.) - ln\rho(25°\ C.)]}{\left[\dfrac{1}{-10+273.15} - \dfrac{1}{25+273.15}\right]}$$

$$B(140°\ C.) = \frac{[ln\rho(140°\ C.) - ln\rho(25°\ C.)]}{\left[\dfrac{1}{140+273.15} - \dfrac{1}{25+273.15}\right]}$$

As the B constant (−10° C.) decreases, the fluctuation range of resistance induced by the change of outside temperature decreases, and the rise of resistance is suppressed at lower temperatures. Therefore, the above-mentioned problem of lowered voltage at low temperature is overcome.

As the B constant (140° C.) increases, resistivity decreases drastically with increase of temperature. Consequently, a heavy current is suppressed immediately after start-up of a circuit equipped with the NTC thermistor, and thereafter, in steady state operation, the power consumption of the circuit is suppressed to a low level. An NTC thermistor having such characteristics is particularly useful as an element for suppression of rush current in a circuit, such as that present during a power switching-on operation, or as a like component through which a heavy current flows.

TABLE 1

| Sample No. | Added element Species | Amount (mol %) | Added element Species | Amount (mol %) | Resistivity $\rho$ 25° C. ($\Omega \cdot$ cm) | B constant B(−10° C.) (K) | B(140° C.) (K) |
|---|---|---|---|---|---|---|---|
| *1-1 | Zr | 1 | Fe | 0 | 19.8 | 2620 | 4730 |
| 1-2 | Zr | 1 | Fe | 0.0005 | 19.8 | 2630 | 4730 |
| 1-3 | Zr | 1 | Fe | 0.001 | 22.6 | 2610 | 4720 |
| 1-4 | Zr | 1 | Fe | 0.01 | 24.9 | 2680 | 4730 |
| 1-5 | Zr | 1 | Fe | 0.1 | 26.2 | 2650 | 4720 |
| 1-6 | Zr | 1 | Fe | 1 | 28.6 | 2630 | 4720 |
| 1-7 | Zr | 1 | Fe | 10 | 50.3 | 2670 | 4730 |
| 1-8 | Zr | 1 | Fe | 20 | 76.1 | 2650 | 4720 |
| 1-9 | Zr | 1 | Fe | 30 | 99.4 | 2640 | 4730 |
| 1-10 | Zr | 1 | Fe | 40 | 139.7 | 2970 | 4210 |
| *1-11 | Zr | 0 | Fe | 5 | 9.4 | 520 | 1580 |
| 1-12 | Zr | 0.0005 | Fe | 5 | 13.1 | 900 | 2510 |
| 1-13 | Si | 0.001 | Fe | 5 | 19.8 | 1930 | 4250 |
| 1-14 | Mo | 0.05 | Fe | 5 | 19.8 | 1820 | 4580 |
| 1-15 | Sn | 0.5 | Fe | 5 | 22.6 | 2410 | 4680 |
| 1-16 | Sb | 1 | Fe | 5 | 24.9 | 1970 | 4460 |
| 1-17 | Te | 1 | Fe | 5 | 26.2 | 2630 | 4530 |
| 1-18 | Hf | 5 | Fe | 5 | 19.6 | 2260 | 4310 |
| 1-19 | Ta | 5 | Fe | 5 | 18.9 | 2100 | 4320 |

TABLE 1-continued

| Sample No. | Added element Species | Amount (mol %) | Added element Species | Amount (mol %) | Resistivity ρ 25° C. (Ω·cm) | B constant B(−10° C.) (K) | B(140° C.) (K) |
|---|---|---|---|---|---|---|---|
| 1-20 | W | 10 | Fe | 5 | 15.4 | 2000 | 4120 |
| 1-21 | Ce | 10 | Fe | 5 | 16.1 | 2090 | 4200 |
| 1-22 | Zr | 20 | Fe | 5 | 12.4 | 800 | 1790 |

TABLE 2

| Sample No. | Added element Species | Amount (mol %) | Added element Species | Amount (mol %) | Resistivity ρ 25° C. (Ω·cm) | B constant B(−10° C.) (K) | B(140° C.) (K) |
|---|---|---|---|---|---|---|---|
| 1-23 | Zr | 1 | Fe | 0.5 | 28.6 | 2630 | 4720 |
|  |  |  | Al | 0.5 |  |  |  |
| 1-24 | Si | 1 | Fe | 1 | 27.3 | 2570 | 4550 |
|  |  |  | Al | 5 |  |  |  |
| 1-25 | Mo | 0.5 | Fe | 5 | 50.3 | 2810 | 4430 |
|  |  |  | Al | 5 |  |  |  |
| 1-26 | W | 0.5 | Fe | 5 | 62.4 | 2850 | 4410 |
|  |  |  | Al | 10 |  |  |  |
| 1-27 | Zr | 0.5 | Fe | 15 | 72.0 | 2730 | 4500 |
|  | Ce | 0.5 | Al | 5 |  |  |  |
| 1-28 | W | 0.05 | Fe | 10 | 67.9 | 2590 | 4620 |
|  | Ce | 1 | Al | 5 |  |  |  |

Tables 1 and 2 show that in the semiconductive ceramic compositions containing $La_{0.94}CoO_3$ as the primary component and, as the secondary components, at least one oxide of a first element selected from the group consisting of Fe and Al and at least one oxide of a second element selected from the group consisting of Si, Zr, Hf, Ta, Sn, Sb, W, Mo, Te and Ce, there is obtained negative resistance-temperature characteristics with a wide range of resistivity ρ at room temperature, while the fluctuations of B constant at −10° C. and 140° C. are restricted within a certain range.

Specifically, if the content of the at least one oxide of an element selected from the group consisting of Fe and Al is about 0.001 mol % or more, significant effects of the added element are obtained, resulting in an increased resistivity at room temperature. Also, if the content is about 30 mol % or less, resistivity at room temperature falls below 100 Ω·cm and the B constant is maintained high at high temperature, preferably resulting in a sufficient reduction of resistance at high temperature.

Especially if the total content of the at least one oxide of an element selected from the group consisting of Fe and Al is about 0.001–30 mol % as the element and the total content of the at least one oxide of an element selected from the group consisting of Si, Zr, Hf, Ta, Sn, Sb, W, Mo, Te and Ce is about 0.001–10 mol % as the element, there can be obtained excellent results: B(−10° C.) of 1820–2850 K, B(140° C.) of 4120–4730 K, and ρ(25° C.) of 15.4–99.4 Ω·cm.

Further, if the total content of the at least one oxide of an element selected from the group consisting of Fe and Al is about 0.01–10 mol % measured as the element and the total content of the at least one oxide of an element selected from the group consisting of Si, Zr, Hf, Ta, Sn, Sb, W, Mo, Te and Ce is about 0.1–5 mol % as the element, B(−10° C.) is 1970–2810 K, B(140° C.) is 4310–4730 K, and ρ(25° C.) is 18.9–50.3 Ω·cm. Thus, there is obtained a semiconductive ceramic composition in which the change of the B constant is further suppressed, although the fluctuation range of resistivity ρ is narrowed.

Also, the same effects as obtained in this Example may be obtained by use of a composition represented by $La_xCoO_3$ as a lanthanum cobalt oxide. Specifically, when the $La_xCO_3$ wherein $0.60 \leq x \leq 0.99$ is used, the B constant at high temperature increases to 3000 K or more, to thereby sufficiently reduce resistance at an elevated temperature.

Moreover, the same effects may also be obtained by use of Nb, Mn, Th, or P instead of Si, Zr, Hf, Ta, Sn, Sb, W, Mo, Te, or Ce employed in the above Example.

EXAMPLE 2

$La_{0.85}Pr_{0.09}CoO_3$ may be used as a lanthanum cobalt oxide.

First, powders of $La_2O_3$, $Pr_6O_{11}$, and $Co_3O_4$ were weighed and mixed so as to adjust the mole ratios of La:Co and Pr:Co to 0.85 and 0.09, respectively. Subsequently, each of the additive elements shown in Table 3 was weighed in a predetermined amount in the form a compound such as an oxide, and incorporated into the weighed powder mixture. The amount of the added element shown in Table 3 represents the amount calculated as the element.

Each of the thus-obtained powder was wet-mixed with pure water and nylon balls for 16 hours, followed by drying. The resultant mixture was calcined at 1000° C. for two hours. The calcined material was treated in the same manner as in Example 1, to thereby obtain an NTC thermistor.

In the same manner as in Example 1, resistivity ρ and B constant were determined of the thus-obtained NTC thermistor. The results are shown in Table 3.

TABLE 3

| Sample No. | Added element Species | Amount (mol %) | Added element Species | Amount (mol %) | Resistivity $\rho$ 25° C. ($\Omega \cdot cm$) | B constant B(−10° C.) (K) | B(140° C.) (K) |
|---|---|---|---|---|---|---|---|
| 2-1 | Zr | 1 | Fe | 0.5 | 29.1 | 2550 | 4620 |
|  |  |  | Al | 0.5 |  |  |  |
| 2-2 | Si | 1 | Fe | 1 | 27.0 | 2590 | 4440 |
|  |  |  | Al | 5 |  |  |  |
| 2-3 | Mo | 0.5 | Fe | 5 | 48.7 | 2630 | 4460 |
|  |  |  | Al | 5 |  |  |  |
| 2-4 | W | 0.5 | Fe | 5 | 65.0 | 2790 | 4450 |
|  |  |  | Al | 10 |  |  |  |
| 2-5 | Zr | 0.5 | Fe | 15 | 72.3 | 2740 | 4510 |
|  | Ce | 0.5 | Al | 5 |  |  |  |
| 2-6 | W | 0.05 | Fe | 10 | 65.7 | 2580 | 4560 |
|  | Ce | 1 | Al | 5 |  |  |  |

As is apparent from Table 3, the semiconductive ceramic compositions containing $La_{0.85}Pr_{0.09}CoO_3$ as a lanthanum cobalt oxide, as in the case of $La_{0.94}CoO_3$ shown in Example 1, provides negative resistance-temperature characteristics with a broad range of resistivity $\rho$ at room temperature, while the fluctuations of B constant at −10° C. and 140° C. are restricted.

EXAMPLE 3

$La_{0.85}Nd_{0.09}CoO_3$ may be used as a lanthanum cobalt oxide.

First, powders of $La_2O_3$, $Nd_2O_3$, and $Co_3O_4$ were weighed and mixed so as to adjust the mole ratios of La:Co and Nd:Co to 0.85 and 0.09, respectively. Subsequently, each of the elements shown in Table 4 was weighed in a predetermined amount in the form of a compound such as an oxide, and was incorporated into the weighed powder mixture. The amount of the added element shown in Table 4 represents the amount as the element.

Each of the thus-obtained powder was wet-mixed with pure water and nylon balls for 16 hours, followed by drying. The resultant mixture was calcined at 1000° C. for two hours. The calcined material was treated in the same manner as in Example 1, to thereby obtain an NTC thermistor.

In the same manner as in Example 1, resistivity $\rho$ and B constant were determined of the thus-obtained NTC thermistor. The results are shown in Table 4.

TABLE 4

| Sample No. | Added element Species | Amount (mol %) | Added element Species | Amount (mol %) | Resistivity $\rho$ 25° C. ($\Omega \cdot cm$) | B constant B(−10° C.) (K) | B(140° C.) (K) |
|---|---|---|---|---|---|---|---|
| 3-1 | Zr | 1 | Fe | 0.5 | 28.5 | 2650 | 4700 |
|  |  |  | Al | 0.5 |  |  |  |
| 3-2 | Si | 1 | Fe | 1 | 24.9 | 2690 | 4560 |
|  |  |  | Al | 5 |  |  |  |
| 3-3 | Mo | 0.5 | Fe | 5 | 55.1 | 2830 | 4490 |
|  |  |  | Al | 5 |  |  |  |
| 3-4 | W | 0.5 | Fe | 5 | 60.0 | 2810 | 4500 |
|  |  |  | Al | 10 |  |  |  |
| 3-5 | Zr | 0.5 | Fe | 15 | 76.4 | 2700 | 4510 |
|  | Ce | 0.5 | Al | 5 |  |  |  |
| 3-6 | W | 0.05 | Fe | 10 | 66.0 | 2620 | 4630 |
|  | Ce | 1 | Al | 5 |  |  |  |

As is apparent from Table 4, the semiconductive ceramic compositions containing $La_{0.85}Nd_{0.09}CoO_3$ as a lanthanum cobalt oxide, as in the case of $La_{0.94}CoO_3$ shown in Example 1, provides negative resistance-temperature characteristics with a broad range of resistivity $\rho$ at room temperature, while the fluctuations of B constant at −10° C. and 140° C. are restricted.

EXAMPLE 4

$La_{0.85}Sm_{0.09}CoO_3$ may be used as a lanthanum cobalt oxide.

First, powders of $La_2O_3$, $Sm_2O_3$, and $Co_3O_4$ were weighed and mixed so as to adjust the mole ratios of La:Co and Sm:Co to 0.85 and 0.09, respectively. Subsequently, each of the elements shown in Table 5 was weighed in a predetermined amount in the form of a compound such as an oxide, and was incorporated into the weighed powder mixture. The amount of the added element shown in Table 5 represents the amount as the element.

Each of the thus-obtained powder was wet-mixed with pure water and nylon balls for 16 hours, followed by drying. The resultant mixture was calcined at 1000° C. for two hours. The calcined material was treated in the same manner as in Example 1, to thereby obtain an NTC thermistor.

In the same manner as in Example 1, resistivity ρ and B constant were determined of the thus-obtained NTC thermistor. The results are shown in Table 5.

TABLE 5

| Sample No. | Added element Species | Amount (mol %) | Added element Species | Amount (mol %) | Resistivity ρ 25° C. (Ω·cm) | B constant B(−10° C.) (K) | B(140° C.) (K) |
| --- | --- | --- | --- | --- | --- | --- | --- |
| 4-1 | Zr | 1 | Fe | 0.5 | 25.0 | 2700 | 4650 |
|  |  |  | Al | 0.5 |  |  |  |
| 4-2 | Si | 1 | Fe | 1 | 24.3 | 2690 | 4690 |
|  |  |  | Al | 5 |  |  |  |
| 4-3 | Mo | 0.5 | Fe | 5 | 48.3 | 2600 | 4570 |
|  |  |  | Al | 5 |  |  |  |
| 4-4 | W | 0.5 | Fe | 5 | 58.0 | 2870 | 4510 |
|  |  |  | Al | 10 |  |  |  |
| 4-5 | Zr | 0.5 | Fe | 15 | 67.9 | 2620 | 4630 |
|  | Ce | 0.5 | Al | 5 |  |  |  |
| 4-6 | W | 0.05 | Fe | 10 | 65.1 | 2680 | 4540 |
|  | Ce | 1 | Al | 5 |  |  |  |

As is apparent from Table 5, the semiconductive ceramic compositions containing $La_{0.85}Sm_{0.09}CoO_3$ as a lanthanum cobalt oxide, as in the case of $La_{0.94}CoO_3$ shown in Example 1, provides negative resistance-temperature characteristics with a broad range of resistance ρ at room temperature, while the fluctuations of B constant at −10° C. and 140° C. are restricted.

In the above Examples 1–4 are used, as lanthanum cobalt oxides, $La_{0.94}CoO_3$, $La_{0.85}Pr_{0.09}CoO_3$, $La_{0.85}Nd_{0.09}CoO_3$, and $La_{0.85}Sm_{0.09}CoO_3$, respectively; however, the present invention is not limited thereto. The amount of La to be substituted is not limited to 0.09. The same effects are obtainable in the case of a lanthanum cobalt oxide in which La is partially substituted with Eu, Y, or a like element.

As the above description clearly indicates, through incorporation of a lanthanum cobalt oxide as the primary component, and as the secondary components, at least one oxide of an element selected from the group consisting of Fe and Al and at least one oxide of an element selected from the group consisting of Si, Zr, Hf, Ta, Sn, Sb, W, Mo, Te, Ce, Nb, Mn, Th and P, there is obtained a semiconductive ceramic composition which has negative resistance-temperature characteristics with an arbitrary room-temperature resistivity from approximately 10 Ω·cm to 100 Ω·cm while the B constant is maintained at a constant level.

Consequently, use of the semiconductive ceramic composition enables the manufacture of a semiconductive ceramic element having negative resistance-temperature characteristics (NTC thermistor element) which is applicable to a circuit suffering a strong rush current or a circuit requiring intensive current suppression.

That is, the thus-obtained semiconductive ceramic element can be widely used as an element for retarding of starting of a motor, protection of the drum of a laser printer, protection of bulbs such as halogen lamps, and elimination of rush current occurring in an apparatus or machine in which an excess current flows at the initial stage of voltage application as well as rush current occurring in a power switching-on operation, and also can be used as a temperature-compensated crystal oscillator or for temperature compensation. However, the present invention is not limited only to these applications.

EXAMPLE 5

Through incorporation of B, the sintered density of the semiconductive ceramic composition may be increased. $La_{0.94}CoO_3$ was used as a lanthanum cobalt oxide in this Example.

First, powders of $La_2O_3$ and $Co_3O_4$ were weighed and mixed so as to adjust the mole ratio of La to Co to 0.94. Subsequently, each of the elements shown in Table 6 was weighed in a predetermined amount in the form of a compound such as an oxide, and was incorporated into the weighed powder mixture. The amount of the added element shown in Table 6 represents the amount as the element.

Each of the thus-obtained powder was wet-mixed with pure water and nylon balls for 16 hours, followed by drying. The resultant mixture was calcined at 1000° C. for two hours. The calcined material was ground, and a vinyl acetate binder was added thereto in an amount of 3 wt. %, followed by additional wet-mixing along with pure water and nylon balls for 16 hours. Thereafter, the mixture was subjected to drying, granulation, press-forming into a disk shape, and was calcined at 1350° C. for two hours in air, to thereby obtain a semiconductive ceramic. Subsequently, a platinum paste was screen-printed onto both surfaces of the semiconductive ceramic, and the semiconductive ceramic was baked at 1000° C. for two hours in air to form external electrodes, to thereby obtain an NTC thermistor.

The thus-obtained NTC thermistor was measured for the electric characteristics of resistivity ρ and B constant. The results are shown in Table 6. In Table 6, the Sample Nos. marked with "*" represent thermistors outside the scope of the present invention, and the others represent those within the scope of the present invention.

TABLE 6

| Sample No. | Added element Species | Amount (mol %) | Added element Species | Amount (mol %) | Resistivity $\rho$ 25° C. ($\Omega \cdot cm$) | B constant = B(140° C.) (K) | Sintered density (g/cm$^2$) |
|---|---|---|---|---|---|---|---|
| *5-1 | Zr | 0.5 | B | 0 | 12.5 | 4730 | 6.2 |
| 5-2 | Zr | 0.5 | B | 0.00005 | 12.5 | 4720 | 6.2 |
| 5-3 | Zr | 0.5 | B | 0.0001 | 12.6 | 4720 | 6.9 |
| 5-4 | Zr | 0.5 | B | 0.001 | 12.4 | 4730 | 7.0 |
| 5-5 | Zr | 0.5 | B | 0.01 | 12.5 | 4720 | 7.0 |
| 5-6 | Zr | 0.5 | B | 0.1 | 12.5 | 4720 | 7.1 |
| *5-7 | Zr | 0.5 | B | 1 | 12.6 | 4730 | 7.1 |
| 5-8 | Zr | 0.5 | B | 5 | 12.6 | 4740 | 7.1 |
| 5-9 | Zr | 0.5 | B | 10 | 14.5 | 4330 | 7.1 |
| 5-10 | Zr | 0.5 | B | 20 | 17.6 | 4040 | 7.1 |
| *5-11 | Zr | 0 | B | 0.1 | 2.3 | 1920 | 7.1 |
| 5-12 | Zr | 0.0005 | B | 0.1 | 5.3 | 3400 | 7.1 |
| 5-13 | Si | 0.001 | B | 0.1 | 9.2 | 4520 | 7.1 |
| 5-14 | Mo | 0.05 | B | 0.1 | 9.8 | 4570 | 7.1 |
| 5-15 | Sn | 0.5 | B | 0.1 | 10.1 | 4620 | 7.1 |
| 5-16 | Sb | 1 | B | 0.1 | 10.8 | 4650 | 7.1 |
| 5-17 | Te | 1 | B | 0.1 | 10.7 | 4650 | 7.1 |
| 5-18 | Hf | 5 | B | 0.1 | 12.1 | 4770 | 7.1 |
| 5-19 | Ta | 5 | B | 0.1 | 12.1 | 4740 | 7.1 |
| 5-20 | W | 10 | B | 0.1 | 11.1 | 4630 | 7.1 |
| 5-21 | Ce | 10 | B | 0.1 | 10.9 | 4610 | 7.1 |
| 5-22 | Zr | 20 | B | 0.1 | 5.7 | 3600 | 7.1 |

As shown in Table 6, in the semiconductive ceramic compositions containing $La_{0.94}CoO_3$ as the primary component, and at least one oxide of an element selected from the group consisting of Si, Zr, Hf, Ta, Sn, Sb, W, Mo, Te and Ce and an oxide of B, negative resistance-temperature characteristics provide a high sintered-density material, while the fluctuations of resistivity at room temperature and B constant at 140° C. are restricted.

If the content of B is about 0.0001 mol % or more as B, significant effects of the added element are obtained, resulting in an increased sintered density. Also, if the content is about 5 mol % or less, resistance is sufficiently reduced at high temperature, while the B constant is maintained high at high temperature.

Specifically, if the total content of the at least one oxide of an element selected from the group consisting of Si, Zr, Hf, Ta, Sn, Sb, W, Mo, Te and Ce is about 0.001–10 mol % as the element, and the content of an oxide of B is about 0.0001–5 mol %, the sintered density is advantageously increased to 6.9 or more, while the fluctuation of resistivity $\rho$ (25° C.) is restricted to 9.2–12.6 and that of B constant (140° C.) is restricted to 4520–4740.

Also, the same effects as in this Example may be obtained by use of a composition represented by $La_xCoO_3$ as a lanthanum cobalt oxide. Specifically, when the $La_xCoO_3$ wherein $0.60 \leq x \leq 0.99$ is used, the B constant increases to 3000 K or more at a high temperature, to thereby sufficiently reduce resistance at an elevated temperature.

Further, the same effects can be obtained in the case of a lanthanum cobalt oxide in which La is partially substituted with Pr, Nd, Sm, Eu, Y, or a like element.

Moreover, the same effects as obtained in this Example may be obtained by use of oxides of Nb, Mn, Th, or P instead of oxides of Si, Zr, Hf, Ta, Sn, Sb, W, Mo, Te, or Ce.

What is claimed is:

1. A semiconductive ceramic composition having negative resistance-temperature characteristics, which composition comprises lanthanum cobalt oxide as the primary component, wherein said lanthanum cobalt oxide is $La_x$-$CoO_3$ and $0.60 \leq x \leq 0.99$, and at least one oxide of an element selected from the group consisting of B, Fe and Al.

2. A semiconductive ceramic composition according to claim 1, further comprising at least one oxide of an element selected from the group consisting of Si, Zr, Hf, Ta, Sn, Sb, W, Mo, Te, Ce, Nb, Mn, Th and P.

3. A semiconductive ceramic composition according to claim 2, wherein said at least one oxide of an element selected from the group consisting of Fe and Al is about 0.001–30 mol % calculated as the element and said at least one oxide of an element selected from the group consisting of Si, Zr, Hf, Ta, Sn, Sb, W, Mo, Te, Ce, Nb, Mn, Th and P is about 0.001–10 mol % calculated as the element.

4. A semiconductive ceramic composition according to claim 3, wherein said at least one oxide of an element selected from the group consisting of Fe and Al is about 0.1–10 mol % calculated as the element and said at least one oxide of an element selected from the group consisting of Si, Zr, Hf, Ta, Sn, Sb, W, Mo, Te, Ce, Nb, Mn, Th and P is about 0.1–5 mol % calculated as the element.

5. A semiconductive ceramic composition according to claim 2, wherein said at least one oxide of an element selected from Si, Zr, Hf, Ta, Sn, Sb, W, Mo, Te, Ce, Nb, Mn, Th and P is about 0.001–10 mol % calculated as the element, and the oxide of B is about 0.0001–5 mol % calculated as the element.

6. A semiconductive ceramic composition according to claim 5, wherein said at least one oxide of an element selected from the group consisting of Si, Zr, Hf, Ta, Sn, Sb, W, Mo, Te, Ce, Nb, Mn, Th and P is about 0.1–5 mol % calculated as the element.

7. A semiconductive ceramic composition according to claim 1, wherein La of said $La_xCoO_3$ is partially replaced with at least one of Pr, Nd, and Sm.

8. A semiconductive ceramic element comprising a semiconductive ceramic having negative resistance-temperature characteristics of claim 1 and at least one pair of electrodes connected to the semiconductive ceramic.

9. A semiconductive ceramic element comprising a semiconductive ceramic having negative resistance-temperature characteristics of claim 2 and at least one pair of electrodes connected to the semiconductive ceramic.

10. A semiconductive ceramic element comprising a semiconductive ceramic having negative resistance-temperature characteristics of claim 3 and at least one pair of electrodes connected to the semiconductive ceramic.

11. A semiconductive ceramic element comprising a semiconductive ceramic having negative resistance-temperature characteristics of claim 4 and at least one pair of electrodes connected to the semiconductive ceramic.

12. A semiconductive ceramic element comprising a semiconductive ceramic having negative resistance-temperature characteristics of claim 5 and at least one pair of electrodes connected to the semiconductive ceramic.

13. A semiconductive ceramic element comprising a semiconductive ceramic having negative resistance-temperature characteristics of claim 6 and at least one pair of electrodes connected to the semiconductive ceramic.

14. A rush current retarding device containing a semiconductive ceramic element according to claim 8.

15. A device for the retarding of starting of a motor containing a semiconductive ceramic element according to claim 8.

16. A temperature-compensated crystal oscillator containing a semiconductive ceramic element according to claim 8.

17. A temperature compensation device containing a semiconductive ceramic element according to claim 8.

* * * * *